US009492740B2

(12) United States Patent
Heller et al.

(10) Patent No.: US 9,492,740 B2
(45) Date of Patent: Nov. 15, 2016

(54) REMOTE AND/OR DISTRIBUTED EQUIPPING OF VIDEO GAME CHARACTERS

(71) Applicant: Activision Publishing, Inc., Santa Monica, CA (US)

(72) Inventors: Noah Heller, Santa Monica, CA (US); Jennifer Puno, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 410 days.

(21) Appl. No.: 13/834,531

(22) Filed: Mar. 15, 2013

(65) Prior Publication Data

US 2013/0331180 A1 Dec. 12, 2013

Related U.S. Application Data

(60) Provisional application No. 61/656,972, filed on Jun. 7, 2012.

(51) Int. Cl.
| | |
|---|---|
| *A63F 9/24* | (2006.01) |
| *A63F 13/00* | (2014.01) |
| *A63F 13/30* | (2014.01) |
| *A63F 13/35* | (2014.01) |
| *A63F 13/63* | (2014.01) |

(52) U.S. Cl.
CPC .............. *A63F 13/12* (2013.01); *A63F 13/35* (2014.09); *A63F 13/63* (2014.09); *A63F 2300/5553* (2013.01)

(58) Field of Classification Search
CPC ...... A63F 13/12; A63F 13/30; A63F 13/323; A63F 13/335; A63F 13/35; A63F 13/60; A63F 13/69; A63F 2300/308; A63F 2300/40; A63F 2300/402; A63F 2300/403; A63F 2300/407; A63F 2300/50; A63F 2300/51; A63F 2300/552; A63F 2300/55; A63F 2300/60; A63F 2300/6009; A63F 2300/609
USPC .......................................... 463/29–31, 40–43
See application file for complete search history.

(56) References Cited

U.S. PATENT DOCUMENTS

| | | | |
|---|---|---|---|
| 5,851,149 A * | 12/1998 | Xidos et al. ................... 463/42 |
| 7,918,738 B2 * | 4/2011 | Paulsen ........................... 463/43 |
| 8,323,112 B2 * | 12/2012 | Bortnik et al. ................ 463/43 |
| 2005/0209008 A1 * | 9/2005 | Shimizu .................. A63F 13/10 463/43 |
| 2008/0026845 A1 * | 1/2008 | Aguilar .................... A63F 13/12 463/42 |
| 2009/0210483 A1 * | 8/2009 | Pierce .................... A63F 13/12 709/203 |
| 2009/0233705 A1 * | 9/2009 | LeMay et al. .................. 463/25 |
| 2009/0315893 A1 * | 12/2009 | Smith .................... A63F 13/12 345/473 |
| 2012/0108309 A1 * | 5/2012 | Aoki et al. ...................... 463/13 |

* cited by examiner

*Primary Examiner* — Milap Shah
(74) *Attorney, Agent, or Firm* — Klein, O'Neill & Singh, LLP

(57) ABSTRACT

Video game characters of a video game may have associated attributes, such as their equipment, modified using a device which may be both remote from a device used to play the video game and incapable of playing the video game. A server in communication with both devices may communicate video game character information to the device remote from the game play device, check validity of modifications to video game character equipment requested by the remote device, save information of the modifications, and provide the information of the modifications to the device used to play the video game. The device used to play the video game may allow for acceptance, and use thereafter, of the equipment modifications during game play.

12 Claims, 6 Drawing Sheets

REMOTE AND/OR DISTRIBUTED EQUIPPING OF VIDEO GAME CHARACTERS

CROSS REFERENCE TO RELATED APPLICATIONS

This application claims the benefit of the filing date of U.S. Provisional Patent Application No. 61/656,972, filed Jun. 7, 2012, the disclosure of which is incorporated by reference.

BACKGROUND OF THE INVENTION

The present invention relates to video games, and more particularly to distributed video game data modification.

Video games are enjoyed by many, often allowing video game players to virtually participate in otherwise unavailable activities, whether due to requirements of skill, experience, or equipment availability, or simply due to inherent dangers of the activities.

In many games a video game player may control a video game character, who may have various skills and powers, and who may be equipped with various items, whether for use in the video game or merely for purposes of visual appearance in a virtual world of the game. Some games may allow for personalization of equipping of video game characters. The personalization may relate to clothing worn by a video game character, whether for function or fashion, and what may be broadly termed accessories. The accessories may be items tradable by a video game character for value within a game, or tools or other useable equipment carried by the video game character for the video game character's use. The personalization may also, in some embodiments, relate to the video game character's skills or capabilities.

Unfortunately, while many video game players may find great enjoyment in equipping or otherwise personalizing their video game characters, the process of doing so may be laborious, and detract from the joys of video game play, particularly when the video game player is situated at a game console and ready to play.

BRIEF SUMMARY OF THE INVENTION

Aspects of the invention provide for remote and/or distributed equipping of video game characters.

In some aspects the invention provides a method for equipping a video game character, comprising: providing information regarding equipment for a video game character; receiving a personalization selection for the video game character from a first compute device, the first compute device being a device other than a compute device configured for video game play including the video game character; checking validity of the personalization selection for the video game character; storing the personalization selection for the video game character; and transmitting the personalization selection for the video game character to a second compute device, the second compute device being a device configured for video game play including the video game character. In some aspects of the invention the personalization selection is equipment associated with the video game character. In some aspects of the invention the personalization selection is capabilities of the video game character. In some aspects the invention the personalization selection is equipment and capabilities of the video game character. In some aspects of the invention, the first compute device is a smartphone. In some aspects of the invention, the first compute device is a tablet computer. In some aspects of the invention, the second compute device is a game console. In some aspects of the invention, the information regarding equipment comprises a list of equipment. In some aspects of the invention, the information regarding equipment further comprises information regarding effectiveness of the equipment within the video game. In some aspects of the invention, the video game character has available different sets of equipment, and aspects of the invention further comprise receiving an identification of a set of equipment to which the selection of equipment applies.

In some aspects the invention provides a system for performing the above-mentioned method(s), the system having at least one processor configured by program instructions to command provision of information regarding personalization to the first compute device, check validity of personalization selection, command storing of personalization selection, and command transmission of the personalization selection to the second compute device.

In some aspects of the invention the information regarding personalization selection is transmitted to the first compute device over a combination of wired and wireless communication links. In some aspects of the invention the transmission of personal selection information to the second compute device is transmitted over elements of a broad area network. In some aspects of the invention the broad area network is the Internet.

In some aspects the invention provides a method for distributed equipping of video game characters comprising: receiving, over a network, a request regarding possible personalization selections for a video game character of a video game; transmitting, over the network, information regarding equipment for the video game character to a first compute device not configured for play of the video game; receiving a personalization selection for the video game character from the first compute device; checking validity of the personalization selection for the video game character; storing the personalization selection for the video game character in memory; and transmitting the personalization selection for the video game character to a second compute device configured for play of the video game.

In some aspects the invention provides a system for distributed equipping of video game characters of a video game comprising: a server including at least one processor, a first compute device not configured for play of the video game, and a second compute device configured for play of the video game, the server, the first compute device, and the second compute device coupled by a network; the at least one processor being configured by program instructions to command transmission of information regarding personalization of a video game character to the first compute device in response to a request from the first compute device for personalization information of the video game character, to check validity of a personalization selection requested by the first compute device, to command storing of the personalization selection, and to command transmission of the personalization selection to the second compute device; the first compute device being configured to request information regarding personalization of the video game character, to make personalization selections for the video game character, and to transmit the personalization selections; and the second compute device being configured to present, during game play, an option to accept the personalization selections and to modify information of the video game character to reflect the personalization selections upon selection of the option.

These and other aspects of the invention are more fully comprehended upon review of this disclosure.

DETAILED DESCRIPTION

Figure 1:
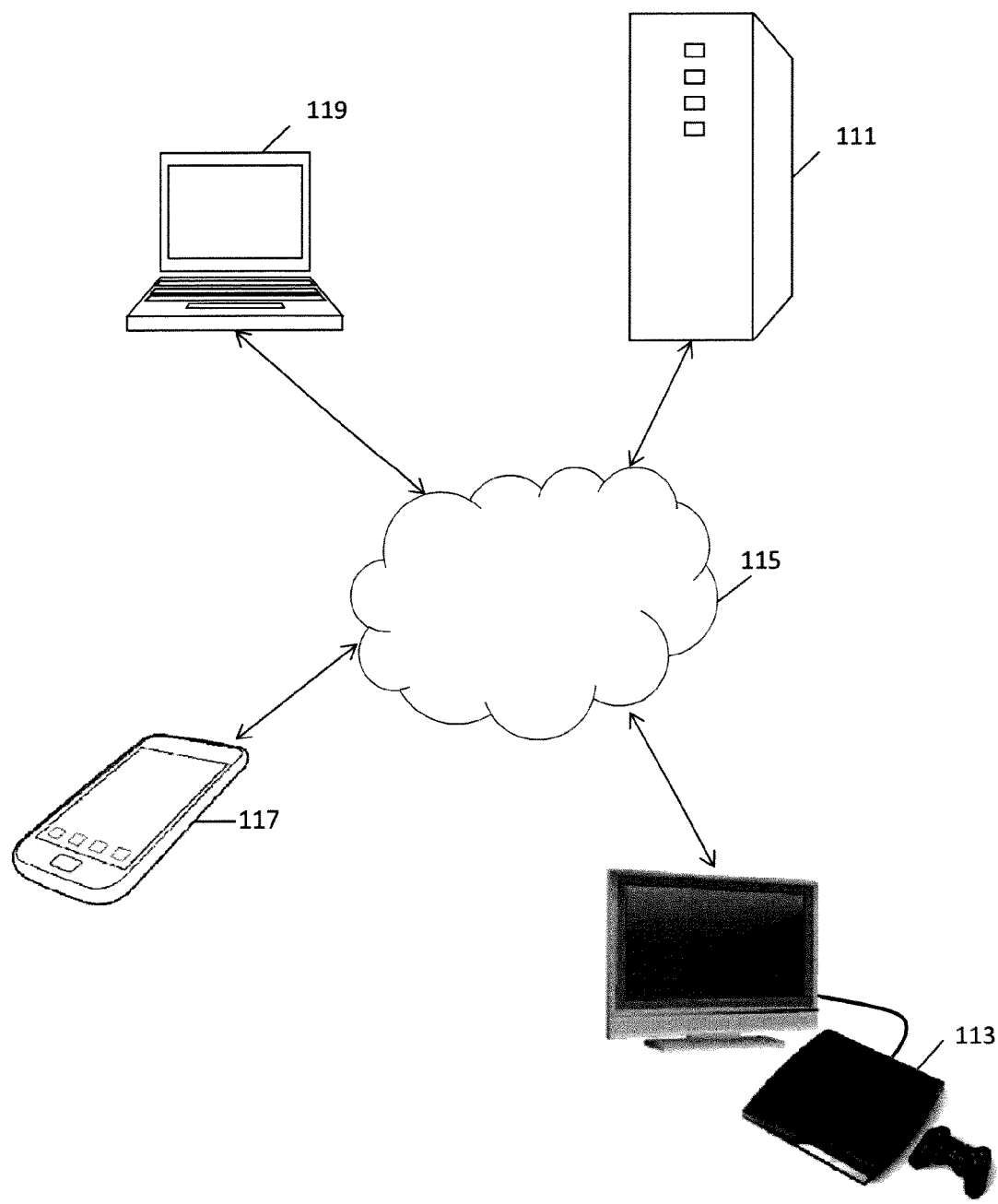
FIG. 1 is a block diagram of a system in accordance with aspects of the invention.

FIG. 1 illustrates a system in accordance with aspects of the invention. A game console 113, with associated monitor and game controller, is configured for play of a video game. The game console may be considered a compute device. During game play the game console, which includes at least one processor, computer memory, communication circuitry, and associated other hardware, executes program instructions to provide for play of the video game, with a video game player providing game play inputs using the game controller and the monitor associated with the game console displaying game play events. In various embodiments the video game may be an action game, for example a fighting game or a first-person shooter game, a role playing game, or a vehicle simulator game. The video game includes a character, who has various skills and capabilities and is equipped with equipment for use and/or display in the video game. The equipment in various embodiments may be items of clothing, weapons or other gear, vehicles or vehicular components, or other items.

The game console is coupled to a network 115. The network may be a broad area network, for example the Internet. Also coupled to the network is a server 111, a mobile compute device, shown as a smartphone 117, and a personal computer, shown in the fowl a laptop computer 119. The server may be for example be part of a server farm, including multiple servers, some of which may provide similar functions, and the server farm may be located at a co-location facility or other facility providing security, environmental conditioning, and wired Internet connections. The laptop may have a wired or wireless connection to the Internet. In some embodiments the laptop may be located approximate the game console, at least at some times, but in many embodiments the laptop is located at locations different than the game console. The smartphone is generally coupled to the Internet by way of a wireless cellular communications system, which may include wired communications links in addition to wireless communication channels.

The server, laptop, and smartphone, of course, each have one or more processors, memory, communication circuitry. and associated hardware.

Skills, capabilities, and/or equipment associated with a game character may be modified through use of the smartphone or laptop, both of which may be considered compute devices, with one or neither in various embodiments configured to provide for game play of the video game. In some embodiments, for example a smartphone, laptop, or other personal computer may be a compute device configured for game play, while in various embodiments some or all of them may not. In some embodiments, using the smartphone and personalization of game character equipment as an example, the smartphone executes an application displaying options for equipping a game character. receives equipment selections, and transmits the equipment selections to the server. The server transmits the equipment selections to the game console, for use during game play, with the game console providing for game play with the game character equipped as indicted by the equipment selections. In some embodiments the server may validate the availability of the equipment selections for the game character, and/or provide additional information regarding equipment to the smartphone, for example to allow a user to investigate properties associated with various items or equipment or otherwise perform research related to selection of equipment.

Figure 2:
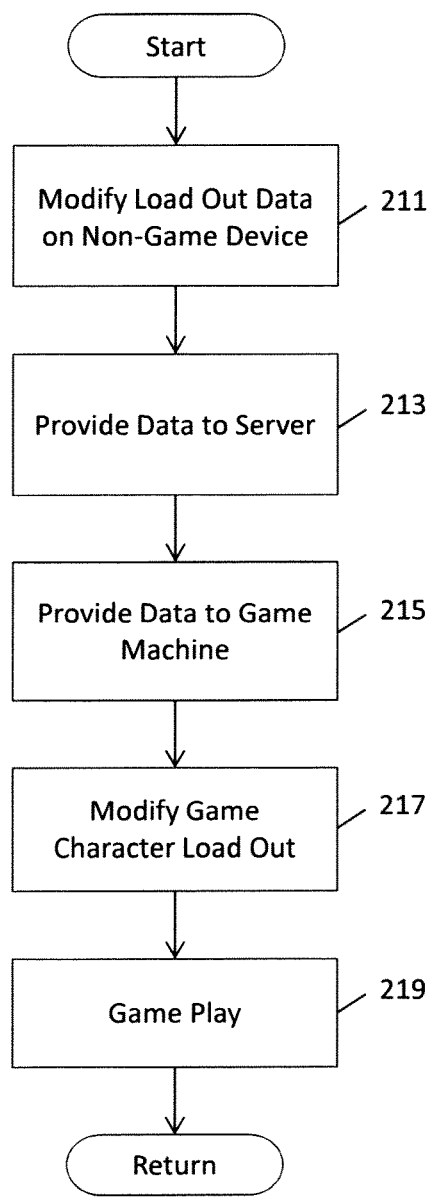
FIG. 2 is a flow diagram of a process for modifying video game character equipment in accordance with aspects of the invention.

FIG. 2 is a flow diagram of a process for modifying video game character personalization in accordance with aspects of the invention. In various embodiments the process of FIG. 2 may be performed by the system of FIG. 1, or elements of the system of FIG. 1. In some embodiments the process of FIG. 2 may be performed and/or have performance commanded by processors of elements of the system of FIG. 1.

In block 211 of the process. personalization information for a video game character of a video game is set or modified on a compute device which is not configured for providing game play. The personalization information may be termed character load out information or simply load out information. In some embodiments the personalization information is limited to particular categories of information, with only a limited predefined number of selections possible within each category. In some embodiments the personalization information comprises equipment associated with a game character. and in some embodiments the personalization information is limited to equipment associated with the game character or such equipment and capabilities related to use of such equipment and/or, in various embodiments, capabilities related to ability to use or call upon use of similar or related equipment.

The compute device which is not configured for game play may. in various embodiments, be a compute device which potentially may be able to execute game program instructions of the video game, but does not have associated hardware which would make the compute device suitable for play of the video game. For example, due to screen display limitations or lack of interface ability with a particular game controller, a particular device, for example a smartphone, may not be suitable for play of the video game. Similarly, in various embodiments the compute device which is not configured for game play may be a compute device for which an operable version of the game program instructions is not available, as may be the case if game program instructions for the video game are only available for use with one, or several, game consoles, but not for smartphones or personal computers.

In some embodiments the personalization information is set or modified by a processor of the compute device commanding display of possible personalization selections, receiving a personalization selection or selections by way of user inputs to the compute device. and setting information reflecting the personalization selections, generally by storing the information in memory of the compute device in most embodiments. In some embodiments the compute device may allow for setting of different sets of personalization selections, with for example the different sets of personalization selections later being available as alternatives during game play on another compute device.

In block 213 the compute device provides the information reflecting the personalization selections to a server. In various embodiments the compute device provides. along with the personalization selections. identification of a game character to which the personalization selections apply, identification of a game player with whom the game character is associated, and/or identification of a game console or game to which the personalization selections apply.

In block 215 the server provides the personalization information to another compute device. The other compute device is configurable and configured to execute game program instructions for the video game. In some embodiments the other compute device is a game console.

In block 217 the other compute device modifies the game character information to reflect the personalization selections indicated by the personalization information. In some embodiments a game player is presented an option to accept the personalization selections prior to modification of the game character information. In some embodiments the game player has an option, prior to or in some embodiments during game play, to accept the personalization selections for use with the game character.

In block 219 the other compute device provides for game play.

The process thereafter returns.

Figure 3:
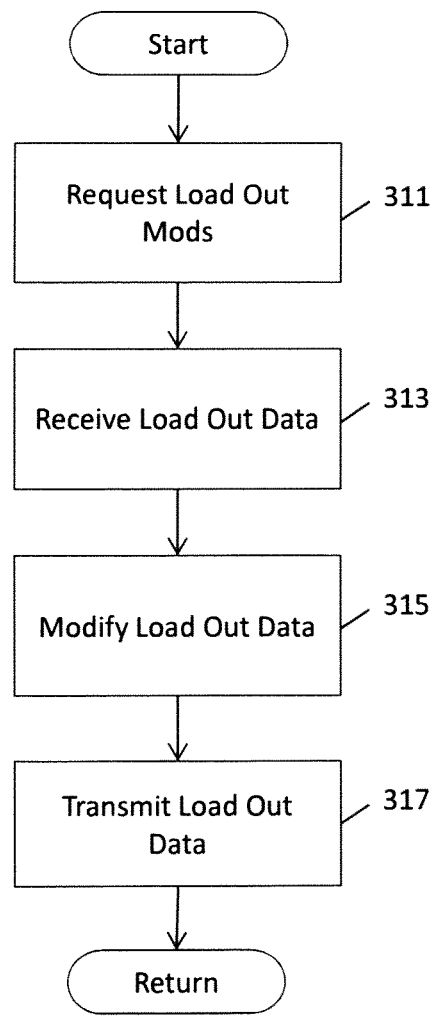
FIG. 3 is a flow diagram of a process, for example performed by a mobile compute device, useful in modifying video game character equipment in accordance with aspects of the invention.

FIG. 3 is a flow diagram of a process, for example performed by a mobile compute device, useful in modifying video game character equipment in accordance with aspects of the invention. In various embodiments the process of FIG. 3 may be performed by a compute device such as the smartphone or the laptop of FIG. 1, or elements of smartphone or laptop of FIG. 1. In some embodiments the process of FIG. 3 may be performed and/or have performance commanded by processors of the smartphone or laptop of the system of FIG. 1.

In block 311 the process requests information regarding possible personalization selections. In some embodiments the request for information is by way of transmission of the request to a server having access to memory storing such information.

In block 313 the process receives information regarding possible personalization selections. In some embodiments the information regarding the possible personalization selections comprises current personal selections for a game character and/or a range of possible personalization selections.

In block 315 the process makes or modifies personalization selections. The personalization selections may be made or modified, for example, based on user inputs to the compute device.

In block 317 the process transmits the personalization selections to the server.

The process thereafter returns.

Figure 4:
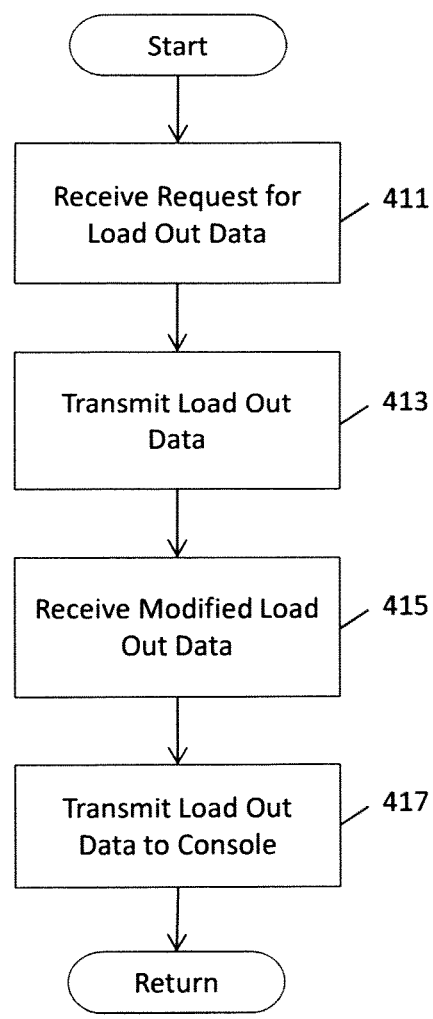
FIG. 4 is a flow diagram of a process, for example performed by a server, useful in modifying video game character equipment in accordance with aspects of the invention.

FIG. 4 is a flow diagram of a process, for example performed by the server of FIG. 1. useful in modifying video game character equipment in accordance with aspects of the invention.

In block 411 the process receives a request over a network for information regarding personalization of a video game character from a compute device.

In block 413 the process transmits over the network information regarding personalization options for the video game character to the other compute device.

In block 415 the process receives modified personalization selections for the video game character from the compute device. In some embodiments the process additionally compares the personalization selections against information stored in memory reflecting allowable personalization selections for the character, with the allowable personalization selections in some embodiments additionally based on rule sets utilizing the information stored in memory. In some embodiments the process does not allow for the personalization selections if the personalization selections are not allowed.

In block 417 the process transmits the personalization selections to a compute device configured to execute game program instructions.

Figure 5:
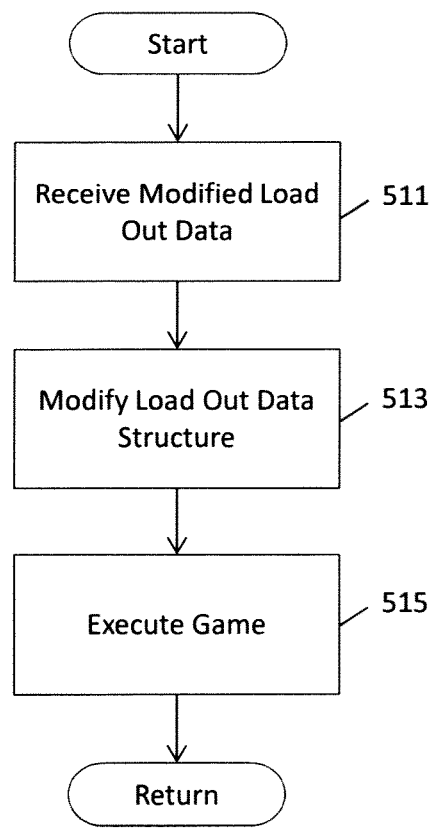
FIG. 5 is a flow diagram of a process, for example performed by a game console, useful in modifying video game character equipment in accordance with aspects of the invention.

FIG. 5 is a flow diagram of a process, for example performed by the game console of FIG. 1, useful in modifying video game character equipment in accordance with aspects of the invention.

In block 511 the process receives personalization selections from a server.

In block 513 the process modifies game character information to reflect the personalization selections.

In block 515 the process provides for game play.

The process thereafter returns.

Figure 6:
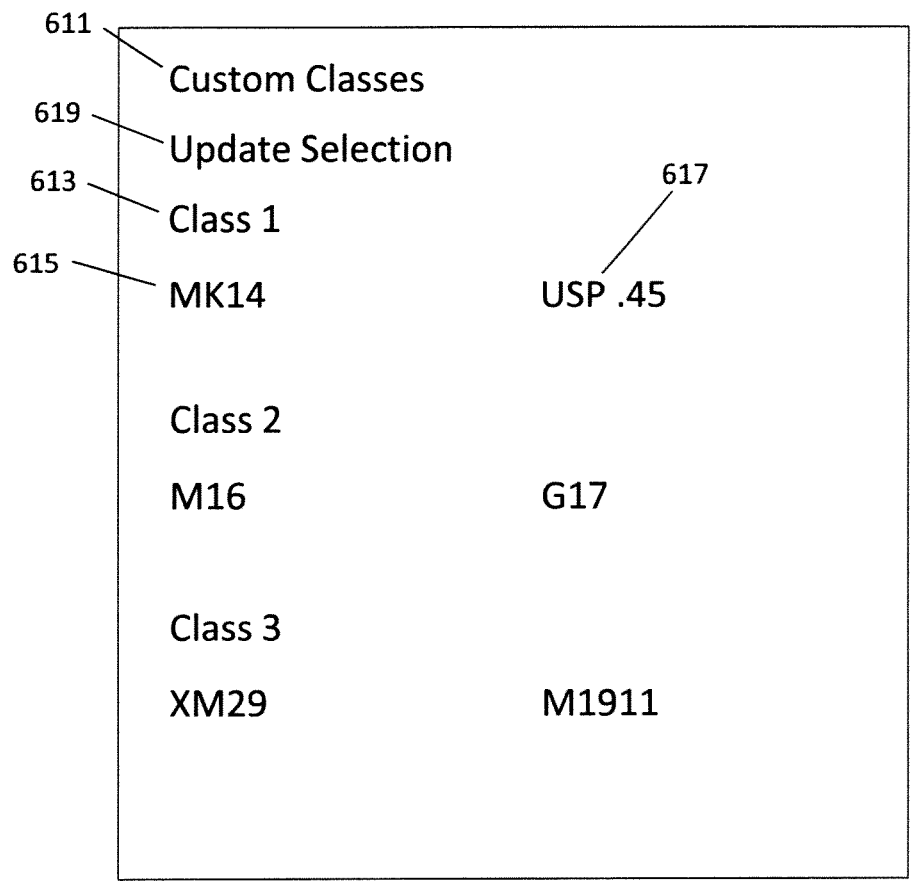
FIG. 6 is a screen shot of a mobile compute device showing equipment for a video game character in accordance with aspects of the invention.

FIG. 6 is a screen shot of a mobile compute device showing selected equipment for a video game character in accordance with aspects of the invention, along with an option to update the selected equipment by transmitting the selection to a server.

In the screen shot of FIG. 6, three different alternative sets, or classes, of personalizations for the video game character are available, each with a larger piece of equipment and a smaller piece of equipment. A Class 1 indicates personalization selections of equipment of a MK14 and a USP 45 caliber. A Class 2 indicates personalization selections of equipment of an M16 and a G17 handgun. A Class 3 indicates personalization selections of an XM29 and a M1911 handgun. Upon selection of the Update Selection option, the device showing the displayed information transmits the personalization selections to a server for further processing.

What is claimed is:

1. A method for distributed equipping of video game characters comprising:

receiving, over a network, a request regarding possible personalization selections for a video game character of a video game;

transmitting, over the network, information regarding equipment for the video game character to a first compute device not configured for play of the video game;

receiving a personalization selection for the video game character from the first compute device;

checking validity of the personalization selection for the video game character by comparing availability of the personalization selection against information stored in memory reflecting allowable personalization selections for the video game character;

storing the personalization selection for the video game character in the memory;

transmitting the personalization selection for the video game character to a second compute device configured for play of the video game;
presenting, by the second compute device, an option to accept the personalization selection;
modifying, by the second compute device, information of the video game character to reflect the personalization selection upon selection of the option; and
providing, by the second compute device, game play of the video game with the video game character equipped in accordance with the personalization selection;
wherein the personalization selection is capabilities related to use of equipment of the video game character.

2. The method of claim 1, wherein the first compute device is a smartphone.

3. The method of claim 1, wherein the first compute device is a tablet computer.

4. The method of claim 1, wherein the second compute device is a game console.

5. The method of claim 1, wherein the transmission of the personalization selection occurs over elements of a broad area network.

6. The method of claim 1, wherein the information regarding personalization selection is transmitted to the first compute device over a combination of wired and wireless communication links.

7. A system for distributed equipping of video game characters of a video game comprising:
a server including at least one processor, a first compute device not configured for play of the video game, and a second compute device configured for play of the video game, the server, the first compute device, and the second compute device coupled by a network;
the at least one processor being configured by program instructions to command transmission of information regarding personalization of a video game character to the first compute device in response to a request from the first compute device for personalization information of the video game character, to check validity of a personalization selection requested by the first compute device by comparing the personalization selection against information stored in memory reflecting allowable personalization selections for the video game character, to command storing of the personalization selection, and to command transmission of the personalization selection to the second compute device;
the first compute device being configured to:
request information regarding personalization of the video game character;
make the personalization selection for the video game character; and
transmit the personalization selection; and
the second compute device being configured to:
present, during game play, an option to accept the personalization selection;
modify information of the video game character to reflect the personalization selection upon selection of the option; and
provide game play of the video game with the video game character equipped in accordance with the personalization selection;
wherein the personalization selection is equipment associated with, and capabilities of, the video game character.

8. The system of claim 7, wherein the first compute device is a smartphone.

9. The system of claim 7, wherein the first compute device is a tablet computer.

10. The system of claim 7, wherein the second compute device is a game console.

11. The system of claim 7, wherein the transmission of information regarding personalization and transmission of the personalization selection occurs over elements of a broad area network.

12. The system of claim 7, wherein the information regarding personalization selection is transmitted to the first compute device over a combination of wired and wireless communication links.

* * * * *